(12) United States Patent
Lewbel

(10) Patent No.: US 8,967,376 B1
(45) Date of Patent: Mar. 3, 2015

(54) DEPLOYABLE ACCESSORY ASSEMBLIES

(75) Inventor: Hannah Rebecca Lewbel, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 333 days.

(21) Appl. No.: 12/881,725

(22) Filed: Sep. 14, 2010

(51) Int. Cl.
*B65D 85/00* (2006.01)

(52) U.S. Cl.
USPC ............................ 206/320; 206/701; 206/576

(58) Field of Classification Search
USPC ............... 206/320, 316.1, 701, 576; 345/901; 362/253, 98, 99, 33
See application file for complete search history.

(56) References Cited

U.S. PATENT DOCUMENTS

| | | | | |
|---|---|---|---|---|
| 6,561,349 | B2 * | 5/2003 | Lee | 206/320 |
| 6,851,822 | B2 * | 2/2005 | Herrera | 362/99 |
| 8,047,670 | B2 * | 11/2011 | Patrick et al. | 362/98 |
| 8,186,843 | B2 * | 5/2012 | Mish et al. | 362/98 |
| 2002/0075669 | A1 * | 6/2002 | Lin et al. | 362/85 |
| 2003/0193795 | A1 * | 10/2003 | Brown | 362/84 |
| 2003/0223228 | A1 * | 12/2003 | Krietzman | 362/198 |
| 2009/0052654 | A1 * | 2/2009 | Hyun et al. | 379/433.11 |
| 2011/0122626 | A1 * | 5/2011 | Huang et al. | 362/253 |
| 2012/0153116 | A1 * | 6/2012 | Harrison | 248/460 |

* cited by examiner

*Primary Examiner* — Luan K Bui
*Assistant Examiner* — Rafael Ortiz
(74) *Attorney, Agent, or Firm* — Lee & Hayes, PLLC

(57) ABSTRACT

Described herein is an accessory assembly that includes a deployable arm that is configured to host multiple different removable accessory devices, each of which may include accessory functionality to facilitate or enhance user operation of an electronic device. The accessory functionality of the accessory devices may be far-ranging and may include reading lights, covers, projectors, universal serial bus (USB) drives, cameras, page-turn buttons, audio jacks, expansion headers, Bluetooth devices, biometric sensors, ambient light sensors, speakers, microphones, styli, and more, as discussed in detail below. These accessory devices may complement the operation of any number of electronic devices, including electronic book (eBook) reader devices, tablet computers, laptop computers, or any other mobile or stationary electronic devices.

22 Claims, 10 Drawing Sheets

DEPLOYABLE ACCESSORY ASSEMBLIES

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
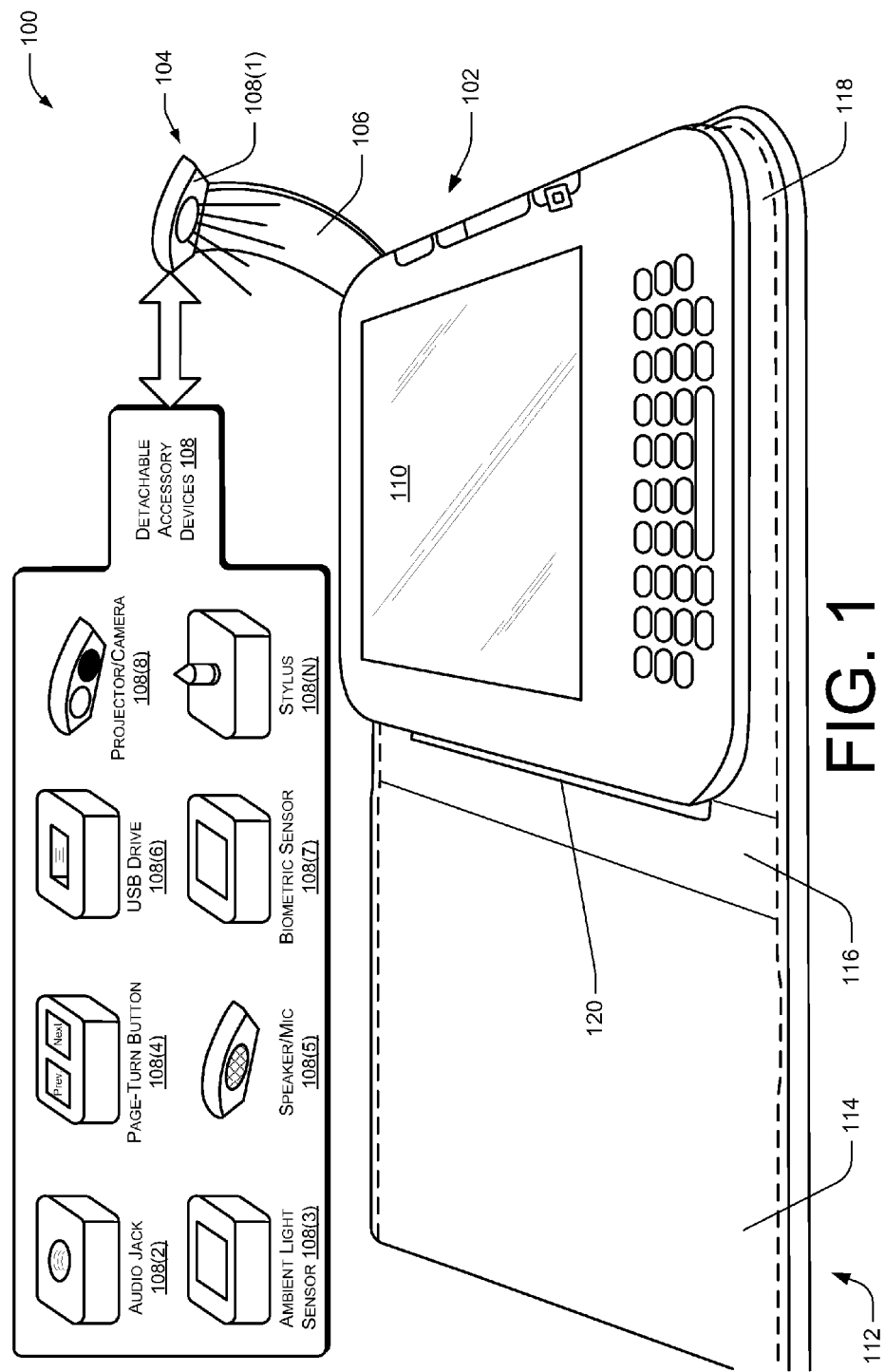
FIG. 1 shows a perspective view of an electronic book ("eBook") reader device and a deployable arm that is configured to host multiple different detachable accessory devices. In the illustrated example, the deployable arm hosts a reading light configured to illuminate a display of the eBook reader device.

This disclosure is directed to a deployable arm that is configured to host multiple different accessory devices, each of which may include accessory functionality to facilitate or enhance user operation of an electronic device. The accessory functionality of the accessory devices (or simply "accessories") may be far-ranging and may include reading lights, covers, projectors, universal serial bus (USB) drives, cameras, page-turn buttons, audio jacks, expansion headers, Bluetooth devices, biometric sensors, ambient light sensors, speakers, microphones, styli, and more, as discussed in detail below. These accessory devices may complement the operation of any number of electronic devices, including electronic book (eBook) reader devices, tablet computers, laptop computers, netbooks, notebooks, desktop computers, mobile or cellular telephones, personal digital assistants (PDAs), multi-functional communication devices, or any other mobile or stationary electronic devices.

Each of these accessory devices may removably attach to the deployable arm magnetically, via screw threads, via force fit, or in any other suitable manner. The deployable arm, meanwhile, may stand alone or may attach to the electronic device, a cover of the electronic device, or any other structure. In some instances, the deployable arm attaches to a cover of the electronic device and is configured to reside within a storage position and an operational position. In the storage position, the deployable arm lies flat within the cover, thus allowing the cover to close the cover over the electronic device. In the operational position, the deployable arm deploys over the electronic device, such as over a display of the electronic device, when the cover is an open state. To deploy in this manner, the deployable arm may comprise a telescoping rod (having a circular, rectangular, or any other cross-sectional shape), a shape-memory alloy connector (e.g., made of spring steel), a high-yield strength metal, a superelastic material, a polypropylene material, or the like.

When in the operational position, the deployable arm may host, detachably, one of the multiple accessory devices. For instance, a user may choose to attach a reading light atop the deployable arm in the operational position. By doing so, the user may be able to more easily read content on the electronic device in low-light conditions. Thereafter, the user may choose to attach a different accessory to the deployable arm. For instance, the user may decide to attach a speaker to the arm for the purpose of consuming audio content with the electronic device. To do so, the user detaches the reading light from the arm and attaches the speaker in its stead.

In some instances, the deployable arm creates a conductive path that allows power and/or data to transfer back and forth between the electronic device and the attached accessory. For instance, the deployable arm may communicatively couple (directly or indirectly) to the electronic device in order to pass power from the electronic device to the attached accessory device. By doing so, the deployable arm may power the reading light, the speaker, or any other attached accessory. In one implementation described below, the cover of the electronic device comprises a physical-electrical connection with the electronic device. As such, the device is able to provide power to the cover, which in turn provides the power to the deployable arm to power to the attached accessory. In other instances, the deployable arm itself may house a power supply, such as one or more batteries.

Similarly, the deployable arm may communicatively couple to the electronic device for the purpose of exchanging data (unidirectionally or bidirectionally) between the electronic device and the accessory attached to the deployable arm. For instance, the electronic device may provide content to an attached projector to allow the projector to project the content onto the electronic device or another surface.

In another example, the attached accessory device may use this data path to communicate a unique identification of the accessory device to the electronic device. For instance, the reading light may communicate its unique identification to the electronic device, which then powers the reading light in response to receiving this identification. While the accessory devices may provide this unique identification via a physical-electrical coupling in some instances, in other instances the accessory devices may provide this identification wirelessly or in multiple other manners, as described below. Further, in instances where an accessory device includes multiple different sets of accessory functionality (e.g., a reading light, a projector, etc.) an orientation of the accessory device relative to the deployable arm may identify which of multiple unique identifications that the accessory device sends to the deployable arm. For instance, the accessory device may send a first unique identification if the accessory device is oriented at a first angle, and a second unique identification if the accessory device is oriented at a second, different angle.

In some instances, the different accessory devices couple with one another to form some or the entire deployable arm. For instance, the multiple different accessory devices may couple magnetically, via screw threads, or in any other manner to create an accessory stack. In this instance, at least the accessory on top of the stack may be operational. To enable this operation, the connected accessory may define a power and/or data path through the stack. For instance, an accessory device at the bottom of the stack may couple to the electronic device, thus receiving power and passing the power up the stack of accessory devices and to the accessory on top, such as the reading light. By doing so, the accessory stack provides operational power where needed.

In some instances, the accessories include a sensor on top and on bottom, such that each accessory is able to identify its position within the stack. With these techniques, the accessory on top of the stack is able to determine that it is in fact on top and, hence, is the accessory device currently in operation. The stack may also communicate this to the electronic device, such that the electronic device is able to provide the proper power and/or data, based upon the identity of the operational accessory.

Illustrative Accessory Assembly and Electronic Device

FIG. 1 shows a perspective view 100 of an electronic book ("eBook") reader device 102 and an accessory assembly 104 configured to implement the techniques described herein. As illustrated, the accessory assembly 104 includes a deployable arm 106 that is configured to host multiple different detachable accessory devices 108. In the illustrated example, the deployable arm 106 hosts a reading light 108(1) configured to illuminate a display 110 of the eBook reader device 102. While FIG. 1 illustrates an eBook reader device, other environments implementing the described techniques may include a laptop computer, a multifunction communication device, a portable digital assistant (PDA), a wireless headset, an entertainment system, a portable media player, a tablet computer, a camera, a video camera, a netbook, a notebook, a desktop computer, a gaming console, a DVD player, a media center, or any other type of device. In addition, the techniques may apply to a variety of accessory devices, as discussed in detail below. As illustrated, the reading light 108(1) couples to the eBook reader device 102 to enable viewing of a display 110 of the device 102 in low-light conditions. To enable this viewing, the deployable arm 106 of the assembly 104 currently resides in an operational position deployed over the display 110. As discussed below, the deployable arm 106 may stow (e.g., within the device, a cover, etc.) in some instances when in a storage position.

In this example, the user operates the accessory assembly to employ the reading light 108(1) to ease the viewing of the display 110. After doing so, however, the user may choose to detach the reading light 108(1) and attach one or more other accessory devices 108 to the deployable arm 106. As described herein, each of these accessory devices 108 functions to facilitate or enhance operation of the electronic device, such as the eBook reader device 102. That is, each accessory device is configured to perform a function that is complementary to the operation of the eBook reader device 102, such as provide a light onto the display 110. As illustrated, the accessory devices may comprise any one or more of the following from the non-exhaustive list of accessory devices:

an audio jack 108(2) to receive a headphone or microphone connection for the purpose of consuming or providing audio content with use of eBook reader device 102;

an ambient light sensor 108(3) to detect an amount of ambient light in an environment proximate to the eBook reader device 102;

a page-turn button 108(4) to navigate the content output by the eBook reader device 102;

a speaker 108(5) to output content from the eBook reader device 102 or a microphone 108(5) to receive audio from the environment proximate to the eBook reader device 102;

a universal serial bus (USB) drive 108(6) to receive a USB card;

a biometric sensor 108(7) to facilitate access to the eBook reader device 102 via biometric credentials;

a projector 108(8) to project content onto the eBook reader device 102 or a camera 108(8) to receive images of an environment proximate to the electronic device; or a stylus 108(N) or multi-touch styli to facilitate operation of a touch sensor of the eBook reader device 102, such as in instances where the display 110 comprises a touch-sensitive display.

While the above list includes a few example accessory devices, other implementations may employ any other similar or different accessory device(s). For instance, these additional accessory devices may include accelerometers, gyroscopes, compasses, magnetometers, and the like.

The accessory assembly 104 may couple fixedly or detachably to the eBook reader device 102 in multiple different configurations. For instance, the assembly 104 may couple via the deployable arm 106 directly to the device 102. In other instances, meanwhile, the assembly 104 may couple with or reside within a cover 112 of the eBook reader device 102 configured to protect the display 110 of the device. As illustrated, the cover 112 includes a front cover panel 114, a spine 116, and a back cover panel 118. In this example, the deployable arm 106 may reside within the back cover panel 118 of the cover 112 when in the storage position.

The cover 112 may physically affix to the eBook reader device 102 by a connection mechanism 120. The connection mechanism 120 may include such things as an adhesive, a hook-and-loop fastener, elastic straps, magnetism, clips, hooks, etc. The connection mechanism 120 is shown in this illustration on the spine 116. In other implementations, the connection mechanism 120 may be located, for example, on an inside surface of the back cover panel 118 or other places on the cover 112. In some implementations, the cover 112 may be formed as a sleeve into which the device 102 is placed. In such implementations, the cover 112 may lack a discrete connection mechanism 120 because the cover 112 itself functions as the connection mechanism 120 by surrounding the device 102.

The connection mechanism 120 may further facilitate an electrical connection as well as a physical connection. For example, the connection mechanism 120 may create a physical-electrical connection that carries electrical current for powering the accessory(s) 108 coupled to the deployable arm 106 of the accessory assembly 104, such as the reading light 108(1). The connection mechanism 120 may also connect the cover 112 to the device 102.

In this implementation, the connection mechanism 120 allows for power and/or data transfer between the device 102 and the accessory assembly 104 via the cover 112. In other implementations, however, the accessory assembly 104 may communicate directly with the device 102. In still other implementations, the power for the accessory assembly 104 may be provided by one or more batteries embedded in the deployable arm 106, in the cover 112, or from an external power source such as an external battery or power cord.

Figure 2:
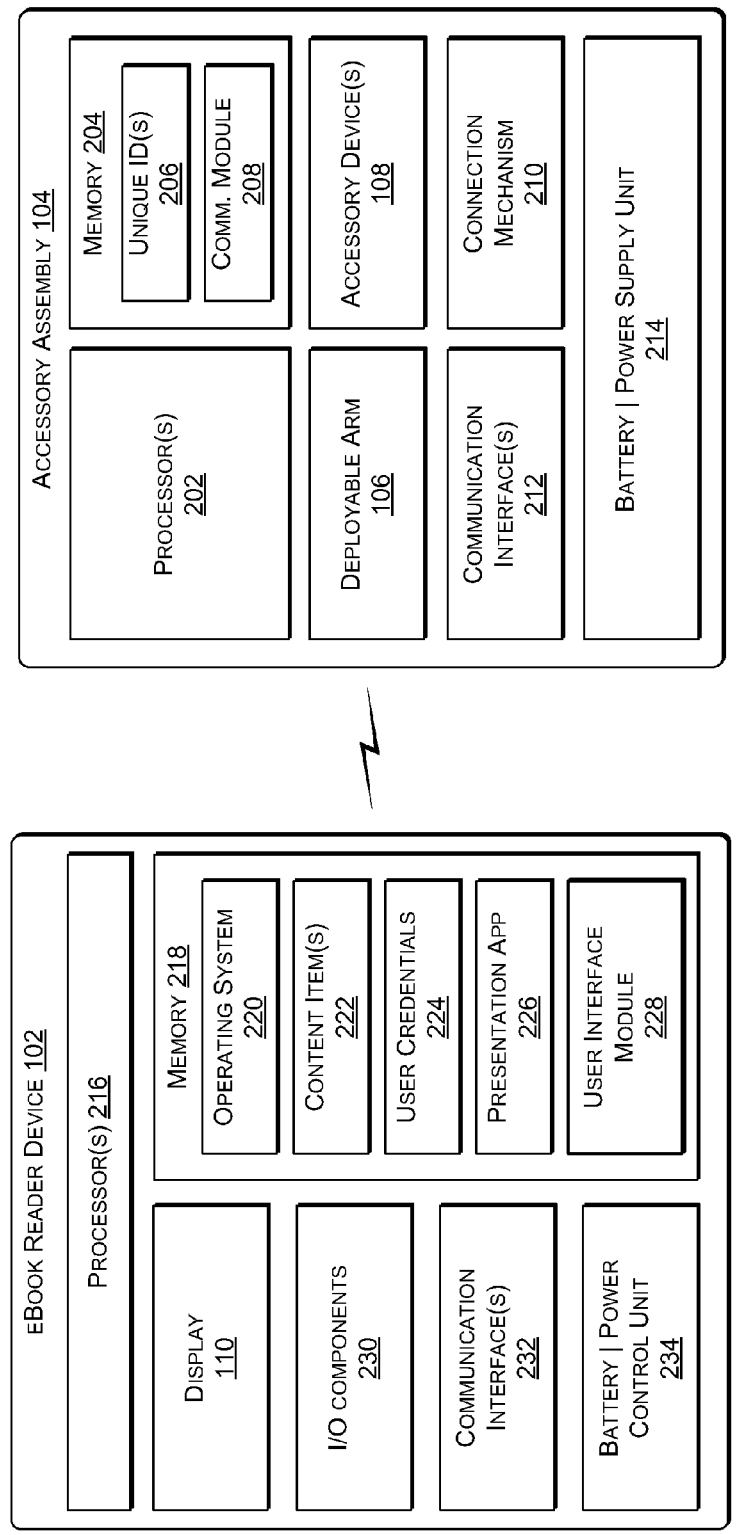
FIG. 2 is a block diagram showing components that may be implemented in subsystems of an electronic device, such as the eBook reader device of FIG. 1, and an accessory assembly that includes the deployable arm.

FIG. 2 is a block diagram showing components that may be implemented in subsystems of an electronic device, such as the eBook reader device 102, and the accessory assembly 104. As illustrated, the accessory assembly 104 may include one or more accessory devices 108, such as any of the accessory devices discussed above. For instance, the accessory devices 108 may comprise a reading light to illuminate a display of an electronic device, a projector to project content onto the electronic device, a USB drive to receive a USB card, portions of a cover to protect a display of the electronic device, or any other functionality that complements the operation of the device.

In addition, the accessory assembly 104 includes the deployable arm that is operable to transition between a storage position and an operational position. As illustrated above, the latter position places the attached accessory device(s) in an operational position, such as above a display of an electronic device.

In addition, the accessory assembly 104 may comprise one or more processors 202, as well as memory 204. The memory 204 is an example of computer storage media and may include volatile and nonvolatile memory. Thus, the memory 204 may include, but is not limited to, RAM, ROM, EEPROM, flash memory, or other memory technology.

As illustrated, the memory 204 may store a unique identification 206 of each attached accessory device, or each accessory device that is configured to attach to the assembly 104. In addition, the memory 204 may store a communication module that allows the accessory assembly 104 to communicate with the attached electronic device, such as the example eBook reader device 102, as well as potentially with other external devices or networks. In some instances, the communication module 208 functions to provide the unique ID of the attached accessory device 108 to the eBook reader device 102. By doing so, the device 102 is able to determine whether to provide power to the accessory, data to the accessory, and/or other parameters that may specific to the identified accessory device 108. While FIG. 2 illustrates that the accessory assembly 104 includes the memory 204, both the memory 204 and the contents therein may reside directly within the accessory device(s) 108 in other implementations.

FIG. 2 further illustrates that the accessory assembly 104 may further include one or communication interfaces 212, such as a physical communication interface and/or a wireless communication interface to enable the communication by the module 208 with the electronic device and/or other devices or networks. For instance, the accessory assembly 104 may utilize a physical communication interface via a connection mechanism 210 between the accessory assembly 104 and the device, such as the eBook reader device 102. In some instances, the connection mechanism may be direct, while in other instances, the connection mechanism 210 may provide an indirect connection mechanism, as illustrated in FIG. 1 via the connection mechanism 120.

Finally, the accessory assembly 104 may include a battery/power supply unit 214 for powering the attached accessory device 108. For instance, the deployable arm 106 may house one or more batteries for powering the attached accessory device 108 in some instances. In other instances, meanwhile, the accessory assembly 104 may instead receive power via a power supply of the device to which the accessory couples, or from another power supply.

The electronic device, such as the eBook reader device 102, may include the electronic display 110 to display electronic documents, such as electronic books or "eBooks". The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any visual content that is in electronic or digital form.

In a very basic configuration, the eBook reader device 102 includes one or more processors 216 and memory 218. Like the memory 204, the memory 218 is an example of computer storage media and may include volatile and nonvolatile memory. Thus, the memory 218 may include, but is not limited to, RAM, ROM, EEPROM, flash memory, or other memory technology, or any other medium which can be used to store media items or applications and data which can be accessed by the device 102.

The memory 218 may be used to store any number of functional components that are executable on the one or more processors 216, as well as data that the device 102 outputs. For example, the memory 218 may store an operating system 220 and one or more content items 222, such as eBooks. The memory 218 may further include a memory portion designated as an immediate page memory to temporarily store one or more pages of an eBook. The pages held by the immediate page memory are placed therein a short period before a next page request is expected.

The term "page," as used herein, refers to a collection of content that is presented at one time in the display 110 of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

The memory may also store user credentials 224, such as a username and password of a user, biometric data of a user, and the like. Thus, the user credentials 224 may be matched against received credentials for the purpose of granting a user access to the device 102 when the credentials match one another. In some instances, the accessory device attached to the deployable arm 106 may comprise a biometric sensor 108(7) for receiving biometric data of the user, which may be stored as the user credentials 224.

In addition, the memory 218 may store one or more content presentation applications 226 that render content on the device 102. These applications may comprise media player(s) that render the content items 222 visually, audibly, or in any other manner. The memory 218 may also store a user interface module 228 that facilitates user operation of the device 102. The user interface module 228 may provide menus and other navigational tools to facilitate selection and rendering of the content items 222. The user interface module 228 may further include a browser or other application that facilitates access to sites over a network, such as websites or online merchants.

The device 102 further includes one or more displays 110, as discussed above. In one implementation, the display 110 uses ePaper display technology, which is bi-stable, meaning that it is capable of holding text or other rendered images even when very little or no power is supplied to the display. The electronic display 110 may also be a reflective display without a backlight that is illuminated by ambient light sources external to the display. Some illustrative displays that may be used with the implementations described herein include bi-stable LCDs, MEMS, cholesteric, pigmented electrophoretic, and others. The display 110 may be embodied using other technologies, such as LCDs, LEDs, and OLEDs. In some implementations, the display 110 may further include a touch screen interface. For instance, the display 110 may comprise a touch-sensitive display or "touch-screen."

The device 102 may further include various input/output (I/O) components 230. Such components may include various user interface controls (e.g., buttons, joystick, keyboard, etc.), audio speaker, connection ports, and so forth. Finally, the device 102 may also include one or more communication interfaces 232 to facilitate communication with external, remote computing sources over various networks, or with other local devices. For instance, these one or more communication interfaces 232 may include a physical or wireless interface to communication with the accessory 108 to receive the unique ID(s) of the attached accessory, as discussed above.

Further, these interface(s) may facilitate the transfer of content (e.g., eBooks, magazines, audio books, etc.), as well as program modules, to the device 102. Each communication interface(s) described herein may support both wired and wireless connection to various networks, such as cellular networks, radio, WiFi networks, short range networks (e.g., Bluetooth), IR, and so forth.

Finally, the device 102 may also include a battery/power control unit 234. The battery/power control unit 234 operatively controls an amount of power, or electrical energy, consumed by the device 102. Actively controlling the amount of power consumed by the device 102 may achieve more efficient use of electrical energy stored by the battery.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Illustrative Deployments of Accessory Assemblies

Figure 3:
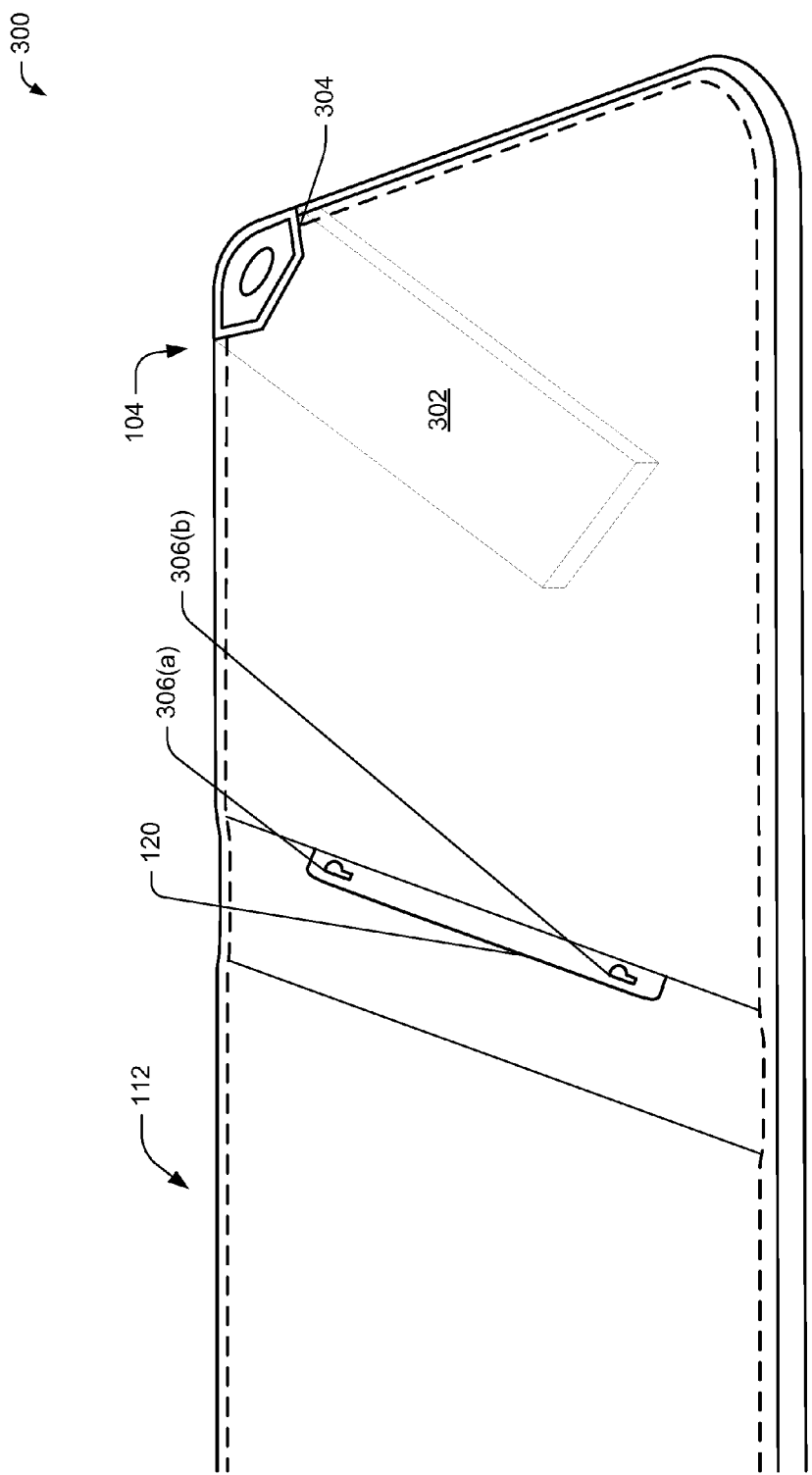
FIG. 3 shows a perspective view of an implementation where a cover of the eBook reader device houses the deployable arm. Here, the deployable arm hosts the reading light and is inserted fully into the cover.

FIG. 3 shows a perspective view 300 of an implementation where the cover 112 of the eBook reader device 102 houses the deployable arm 106. Here, the deployable arm 106 again hosts the reading light 108(1) and is inserted fully into the cover 112. In this illustration, the device 102 is omitted to better illustrate the features of the accessory assembly 104.

In the illustrated implementation, the deployable arm 106 is sufficiently thin to be concealed within the cover 112 when the deployable arm 106 is in the storage position and the reading light 108(1) is not in use. For instance, the deployable arm 106 may occupy a sleeve 302, a pocket, or the like within the cover 112. When fully inserted into the cover 112, an end of the deployable arm 106 may remain exposed. In some instances, the accessory may remain attached, as shown in the illustrated example.

In addition, the end of the deployable arm may have a gripping surface 304 for a user to grasp in order to deploy the arm 106 from the cover 112. For example, the user may grab the exposed gripping surface 304 with a thumb and index finger, and then pull the deployable arm 106 out from the cover 112. In some implementations, the end of the deployable arm 106 forms a seal with the cover 112 when the deployable arm 106 is fully inserted into the cover 112. This seal can prevent contaminants from entering the cover 101 when the deployable arm 106 is in the storage position.

The perspective view 300 also shows one implementation of the connection mechanism 120. In this implementation, the connection mechanism 120 may comprise one or more hooks 306. For example, two hooks 306(*a*) and 306(*b*) may be used to couple the cover 112 to the device 102. Each hook 306(*a*), 306(*b*) may be electrically conductive, with one of the two hooks 306(*a*) carrying a positive current while the other hook 306(*b*) carries a negative current. Alternatively, a single electrically-conductive hook 306, providing a single current path, may contain a plurality of conductors insulated from one another. For example, a top conductive layer may be separated from a bottom conductive layer by an insulator, forming two conductive pathways. Alternately, a non-conductive hook 306, or a hook 306 coated with an insulator, may have a plurality of conductive traces on a surface of the hook 306.

As discussed above, power supplied to the cover 112 by the hooks 306 or another connection mechanism may be provided to the accessory assembly 104 by wiring or other electronics within the cover 112. The accessory assembly 104 may then provide this power to the attached accessory if the accessory comprises a powered accessory. In addition, the hooks 306 may similarly facilitate data communication between the accessory assembly 104 and the eBook reader device 102.

Figure 4:
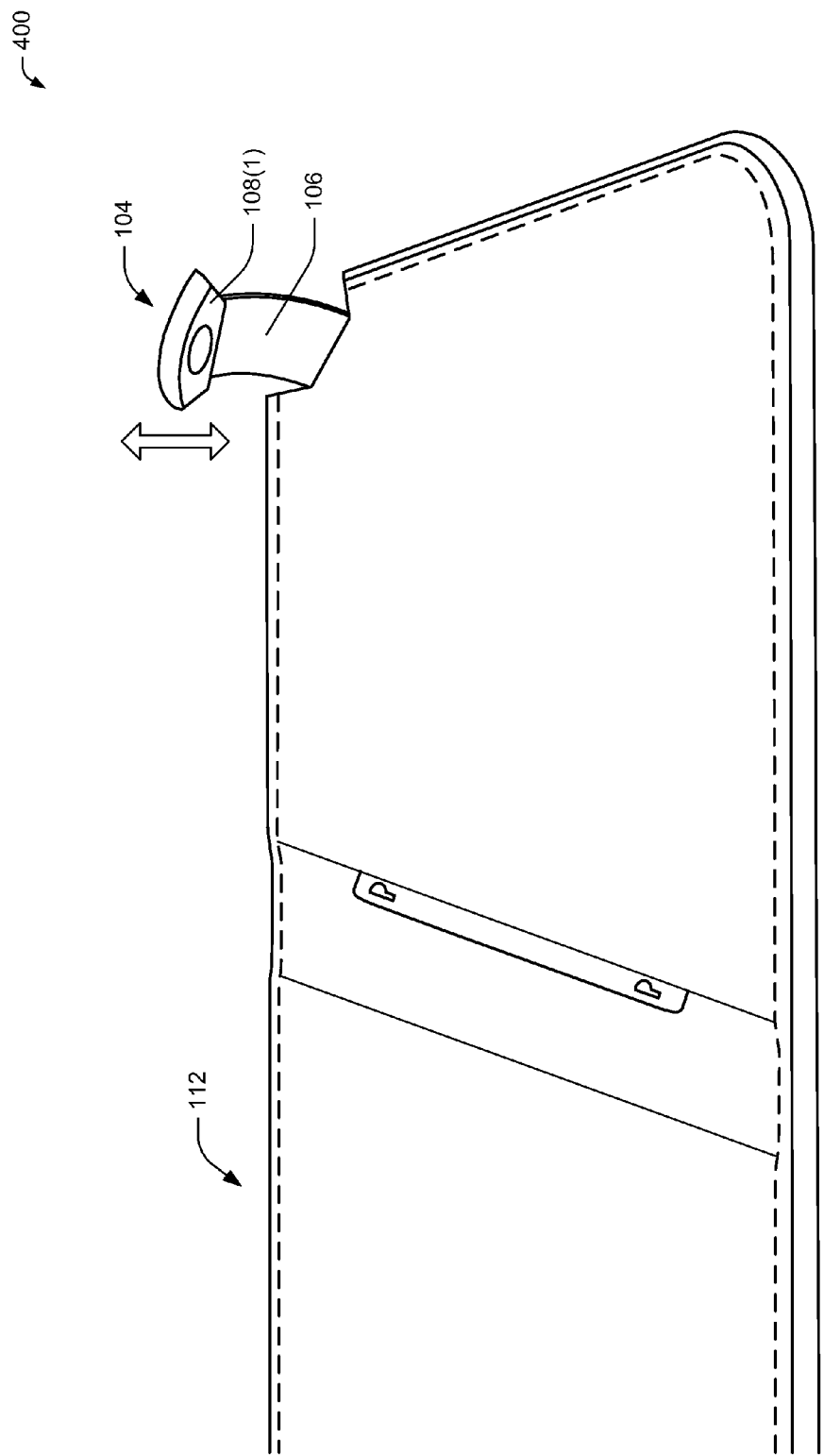
FIG. 4 shows a perspective view of the cover with the deployable arm partially withdrawn from the cover.

FIG. 4 shows a perspective view 400 of the cover 112 with the deployable arm 106 partially withdrawn from the cover 112. In some implementations, the deploying of the arm 106 may function to power on an attached accessory device 108, such as the reading light 108(1). For instance, the reading light 108(1) may power on after the deployable arm 106 is withdraw a threshold distance (thus triggering a power switch). In still other implementations, an amount of power provided to the attached accessory device 108 may changes depending upon a distance that a user has withdrawn the deployable arm 106. For instance, the device 102 or other power supply (e.g., the cover 112) may provide greater power as the user continues to withdraw the deployable arm 106. In the example of the reading light 108(1), the light may reach maximum illumination when fully withdrawn. Conversely, the attached accessory, such as the reading light 108(1) may be automatically turned off when placed in the storage position, as FIG. 3 illustrates.

To provide this power granularity to the attached accessory device 108, a mechanism in the cover 112 may detect a distance that the deployable arm 106 is withdrawn from the cover 112 and adjust the power provided accordingly. In some implementations, the mechanism may be a variable resistor coupled to deployable arm 106 or alternatively coupled to an inside surface of the sleeve 302. In other implementations, a mechanical sensor such as a rotatable wheel is moved as the deployable arm 106 is withdrawn from or inserted into the cover 112 thereby generating a signal which may be used to adjust the amount of power provided. In addition, other implementations may employ alternate mechanisms.

Figure 5:
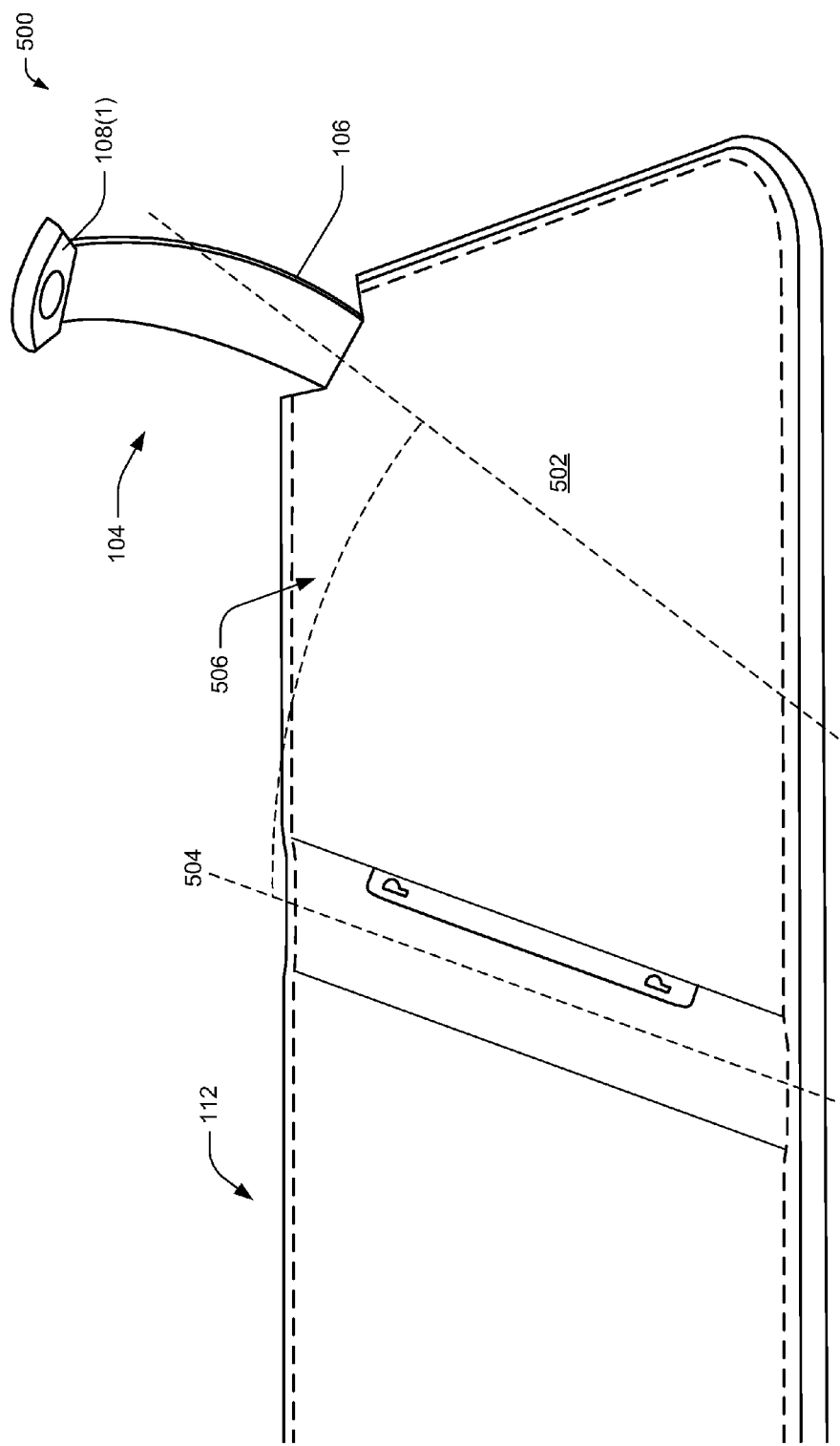
FIG. 5 shows a perspective view of the cover with the deployable arm fully withdrawn from the cover.

FIG. 5 shows a perspective view 500 of the cover 112 with the deployable arm 106 fully withdrawn from the cover 112. When fully withdrawn from the cover 112, a geometry of the deployable arm 106 may allow the cover 112 to transition between an open state (as illustrated) and a closed state. The flexibility in the shape of the deployable arm 106 may create this geometry that allows the cover 112 to be closed when the deployable arm 106 is fully withdrawn from the cover.

The deployable arm 106 may be constructed from materials including, but not limited to, a high-yield strength metal, a superelastic material, a polypropylene material, and a shape-memory alloy. Shape-memory alloy includes spring steel, smart metal, memory alloy, smart alloy, alloys of copper-zinc-aluminum-nickel, alloys of copper-aluminum-nickel, alloys of nickel-titanium, and other materials having the properties generally associated with shape-memory alloys. In some implementations, the deployable arm 106 may lie flat within the cover when retracted and automatically curl over the display 110 when slid out of the cover 112 to position the attached accessory 108 over the display. For example, if the deployable arm 106 is constructed from shape-memory alloy, the shape-memory alloy may automatically change from a flat shape when inserted into the cover 112 to a curved shape when withdrawn from the cover 112. While the deployable arm 106 is illustrated herein as a flat strip of material, the deployable arm 106 may also take other forms such as a wire or tube.

Without regard to the material, the positioning of the deployable arm 106 when in the operational position provides benefits to the attached accessory devices 108(1)-(N). For instance, this position may allow the reading light 108(1) to illuminate the display 110, as well as allow the projector/camera 108(8) to project images and/or gather input proximate the display 110. This positioning may also enable a user to easily utilize the page-turn button 108(4) or the speaker/microphone 108(5). Other ones of the accessory devices 108(1) may also benefit in these and other ways due to the positioning of the deployable arm 106 over the display 110. Further, the deployable arm may reside in other positions relative to the display 110 and the device 102 in other implementations.

In some of the implementations described above, the deployable arm 106 supplies power from the device 102 and to the attached accessory(s) 108. To do so, the deployable arm 106 may be constructed from an electrically-conductive alloy or metal to carry electricity to the attached accessory. In this implementation, the amount of power provided may be such that the strength of an electric current flowing through the deployable arm 106 is not perceivable to a user touching the deployable arm 106. In other implementations, power may be supplied to the attached accessory 108 by mechanisms including, but not limited to, a separate wire running from the cover 112 to the accessory, electrically conductive traces along the surface of the deployable arm 106, wires inside a hollow chamber (e.g., in a tube) of the deployable arm 106, and the like.

FIGS. 1 and 3-5 show an illustrative example in which the accessory assembly 104 is located in a top, outside corner of the back cover panel 118. In other implementations, the accessory assembly may be situated differently, such as along other corners of the cover 112, along an edge of the cover 112, or along the spine 116, as described immediately below with reference to FIGS. 6 and 7. In still other instances, the accessory assembly 104 may be integral or may couple with the device 102, or may comprise a standalone device that does not couple to the cover 112 or the device 102.

In the illustrative example shown in FIGS. 1 and 3-5, an axis 502 along which the deployable arm 106 moves when withdrawn from or inserted into the cover 112 is not parallel to an axis 504 defined by the spine 116. The angle 506 formed by the axis 502 and the axis 504 is approximately 45° in the illustrative examples. More generally, the angle 506 may be between approximately 22° and 68° in certain implementations.

Although the cover 112 including the accessory assembly 104 is described herein as adapted for coupling to the eBook reader device 102, the cover 112 may also be adapted for coupling to other electronic devices or to non-electronic devices such as a book or a notepad. In each of these instances, the approximate range of the angle 506 may vary.

Figure 6:
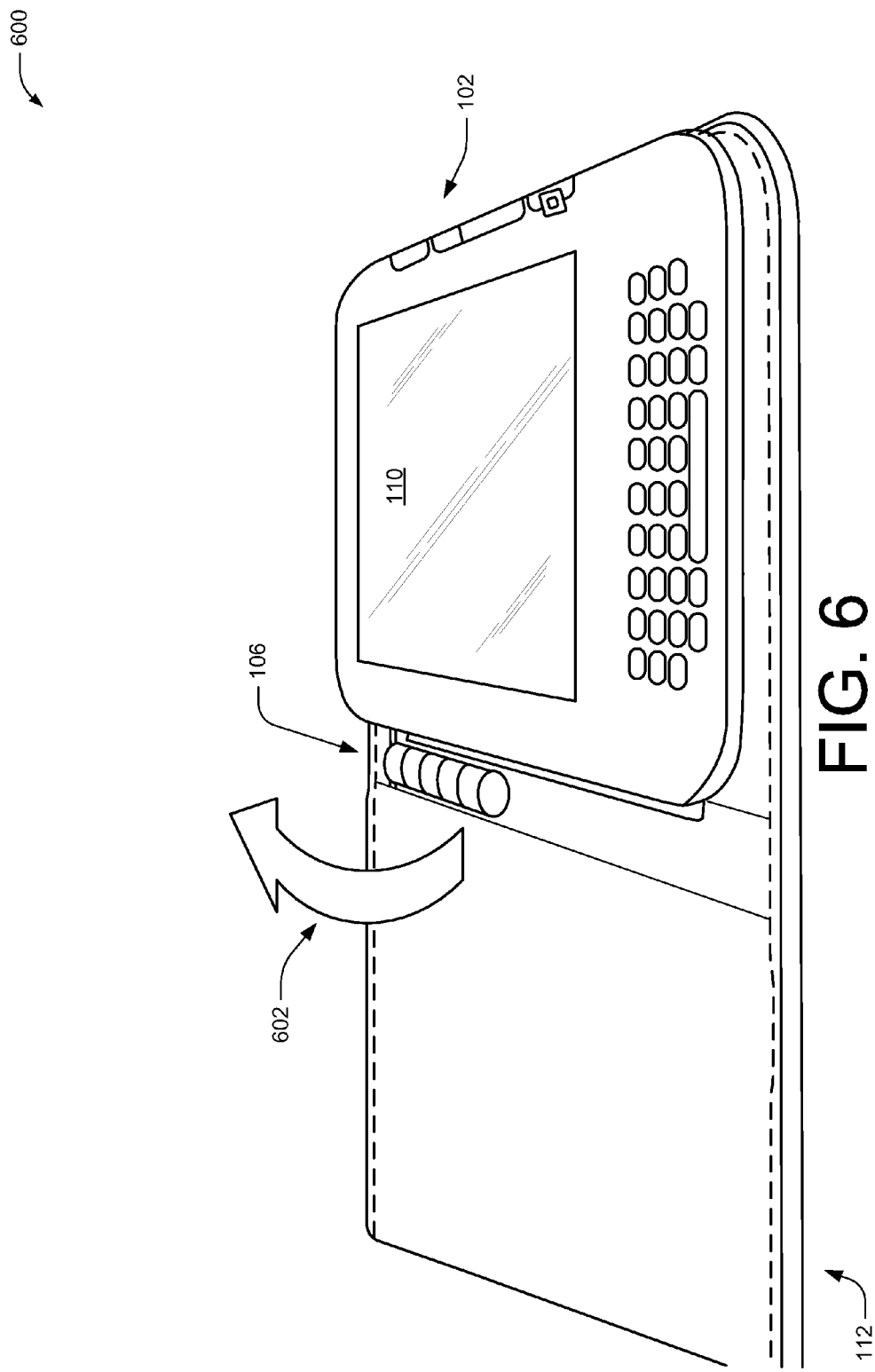
FIG. 6 shows a perspective view of another implementation where the cover of the eBook reader device houses the deployable arm. This illustration depicts the deployable arm in a storage position, and also depicts a direction in which to deploy the arm into an operational position.

FIG. 6 shows a perspective view 600 of another implementation where the cover 112 of the eBook reader device 102 houses the deployable arm 106. Here, the deployment arm 106 comprises a telescoping rod, currently in a storage position. While FIG. 6 illustrates the deployable arm 106 being stored free from an attached accessory, the arm 106 may store while coupled to one or more accessories 108 in some instances. FIG. 6 also illustrates a direction 602 in which a user may deploy the arm 106 into an operational position.

Figure 7:
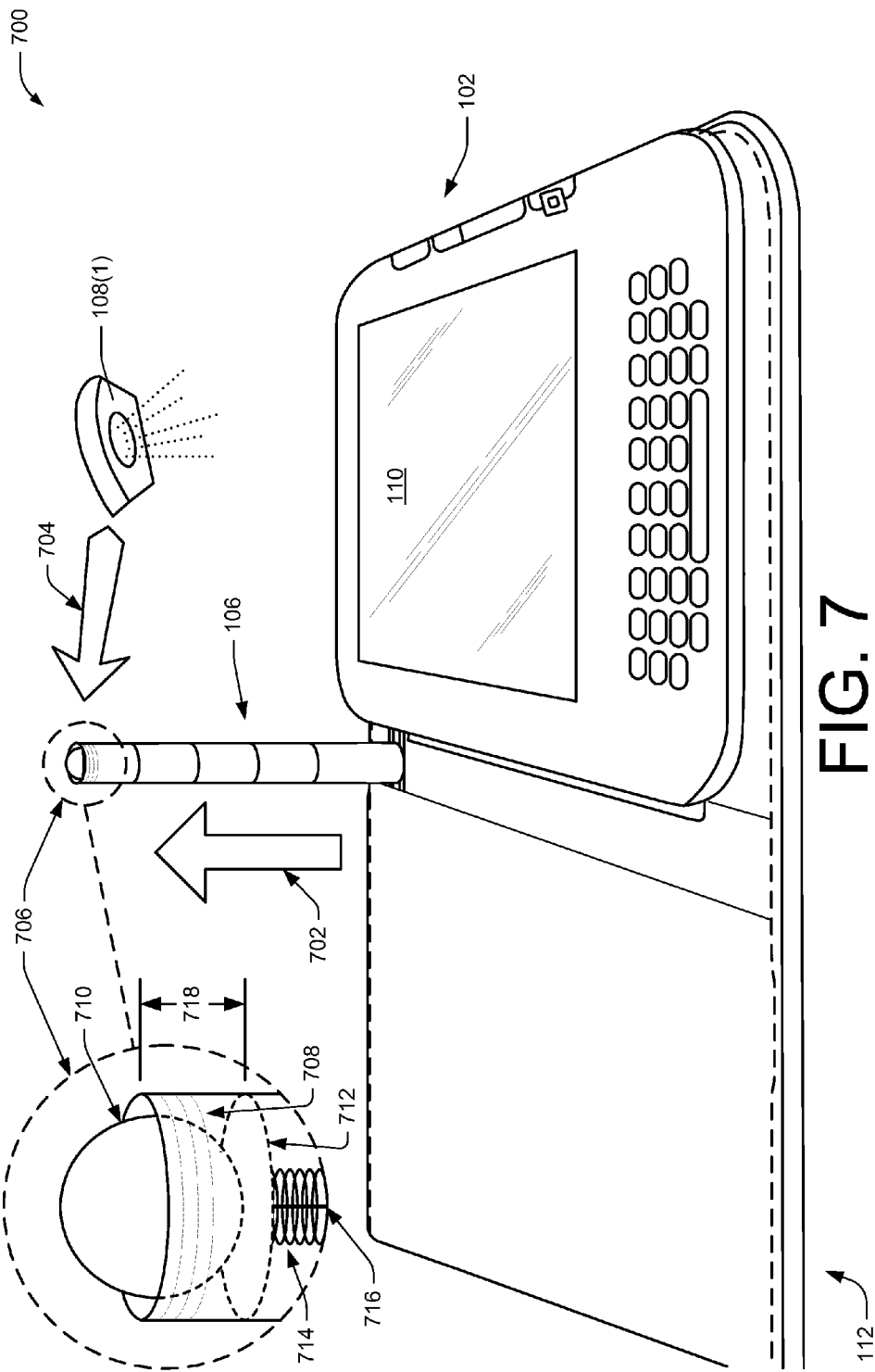
FIG. 7 shows a perspective view of the implementation of FIG. 6 after the deployable arm has been deployed into the operational position. This illustration also depicts example details of a connection mechanism of the arm to which detachable accessory devices may attach.

FIG. 7 shows a perspective view 700 of the implementation of FIG. 6 after the deployable arm 106 has been deployed into the operational position. That is, the user of the device 102 has swung the arm in the direction 602 of FIG. 6 as well as pulled out the telescoping rod in an upwards direction 702. After the user positions the deployable arm 106 in the operational position, as illustrated, the user may attach an accessory device to an upper end of the arm 106. Here, an arrow 704 represents the user attaching the reading light 108(1) to the arm 106.

In addition to depicting the illustrated operational position, FIG. 7 further illustrates an example implementation of a connection mechanism 706 configured to mate the deployable arm 106 to the attached accessories 108, such as the illustrated reading light 108(1). First, the connection mechanism 706 may include one or more screw threads 708 that allow one of the accessory devices 108 to attach onto the deployable arm 106 in instances where the accessory devices 108 include complementary internal threads. While FIG. 7 illustrates screw threads, the accessory devices 108 may attach magnetically, via a force fit, or in any other suitable manner in other implementations.

FIG. 7 further illustrates that the connection mechanism 706 provides an electrical connection between the deployable arm 106 and the accessory device in the form a metal ball 710. The metal ball 710 may make contact with an electrical connection on an underside of the accessory device 108, thus allowing power and/or data to transfer between the deployable arm 106 and the accessory device 108. Further, in some instances the metal ball 710 may be magnetic so as to further serve to couple detachably the accessory device 108 to the deployable arm 106. While this figure illustrates the electrical connection in the form a metal ball, other implementations may employ any other shaped connection, such as a cylinder or any other configuration.

In addition to contacting the accessory device 108 on a top side of the metal ball 710, the metal ball 710 contacts a conductive plate 712 on an underside of the ball 710. In turn, the conductive plate may contact a spring 714 and/or may couple with circuitry wire 716 for passing power and/or data signals between the eBook reader device 102 and the attached accessory 108.

In some instances, the connection mechanism may help signal the identity of a currently attached accessory 108 to the eBook reader device 102. For instance, a manufacturer of the multiple different accessory devices 108 may construct these accessory devices such that a different length of each device enters into the deployable arm 106 when connected. For instance, the reading light 108(1) may protrude one centimeter (1 cm) into the deployable arm 106 when attached, while the stylus 108(N) may protrude one and a half centimeters (1.5 cm) into the arm 106 when attached.

In these instances, the circuitry of the connection mechanism 706 may determine a depth 718 of the conductive plate 712 and may map this depth to the associated accessory device 108. The wire 716 may then carry this identification to the eBook reader device 102, which may interpret the signal and provide the proper power and/or data, if any, to the identified accessory.

In other instances, the circuitry may measure a tension on the spring 714 and may map this tension to a corresponding accessory device. In still other instances, the connection mechanism 706 may include multiple pins along, for instance, an inner sidewall of the deployable arm 106. Here, each accessory may be constructed so as to contact a unique pin when attached to the arm. In these and other instances, the wire 716 may provide the identification of the accessory device 108 to the eBook reader device 102.

In still other instances, the metal ball 710 (or any other connection) may comprise multiple different materials and/or pads. Here, these different materials or pads could enable different types or levels of communication between the eBook reader device 102 and the attached accessory device. For instance, when the a first portion of the metal ball 710 contacts the inside of the deployable arm 106 at a location of the ball having a first type of material, this connection could convey a first signal to the eBook reader device. If, however, the ball 710 contacts the arm 106 at a second location of the ball having a second material (e.g., having a different resistance than the first material), this connection could convey a second different signal, and so forth. As such, a metal ball 710 or other connector having differing materials may enable multiple different levels of communication between the accessory device and the eBook reader device 102 or other electronic device.

Figure 8:
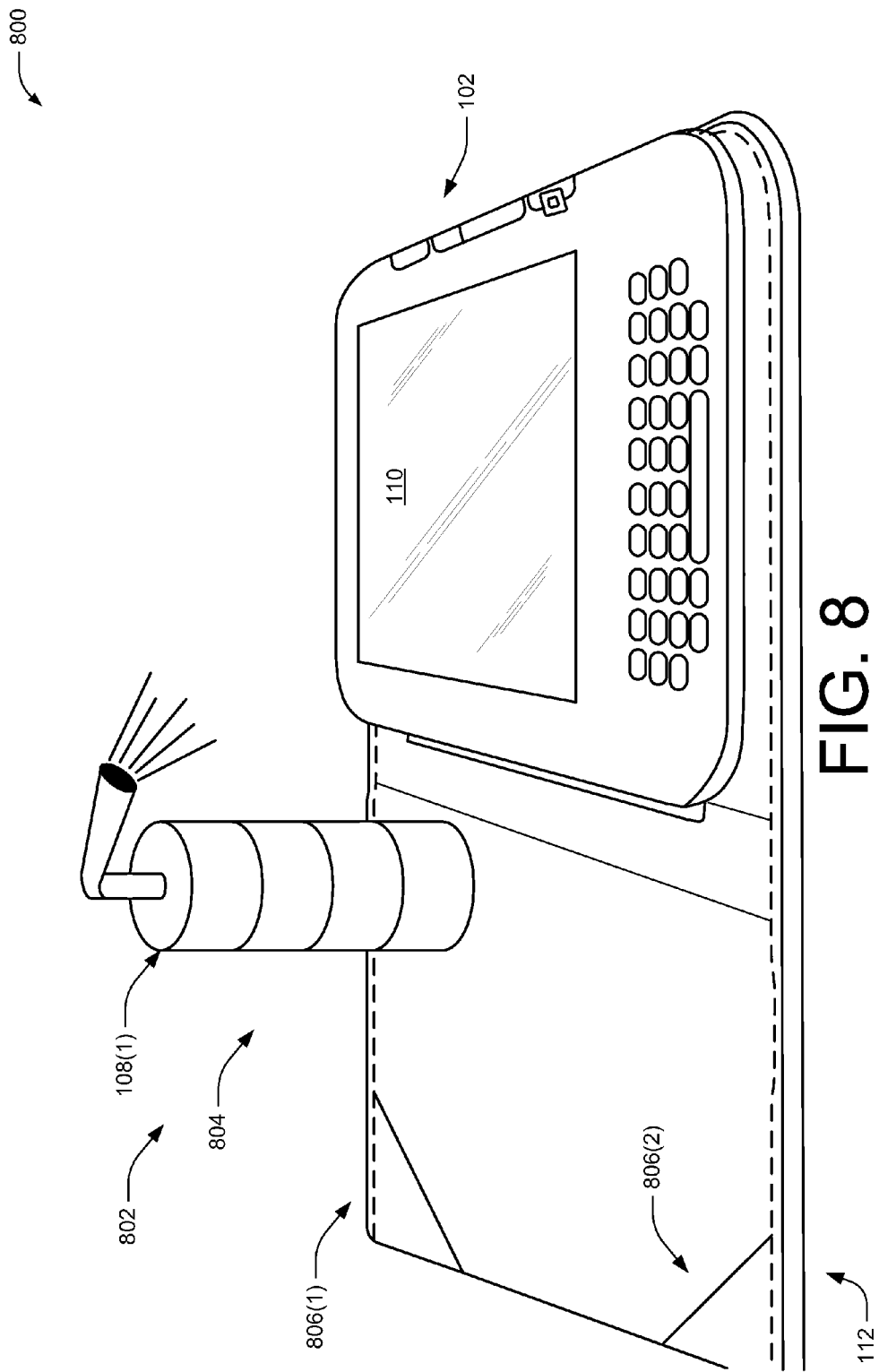
FIG. 8 shows a perspective view of another implementation. Here, the deployable arm comprises multiple different accessory devices stacked atop one another, with a reading light residing on top in the illustrated configuration.

FIG. 8 shows a perspective view 800 of an implementation of another accessory assembly 802. Here, the accessory assembly 802 comprises a deployable arm 804 that is made up of multiple different accessory devices 108 stacked atop one another, with a reading light 108(1) residing on top in the illustrated configuration. Specifically, in this example the deployable arm consists of four different accessory devices 108, with the reading light 108(1) residing on top and, hence, operating to illuminate the display 110 of the eBook reader device 102.

In this configuration, the accessory assembly 802 may attach to footprint within the cover 112 or may comprise a standalone unit that includes its own power supply. In either instance, the stacked accessory devices communicate with one another to pass power and/or data through the stack. For instance, the stacked accessory devices 108 may pass power and/or data between the reading light 108(1) and the eBook reader device 102 in the illustrated implementation. As discussed above, these accessory devices may couple magnetically, via screw threads, via a form fit, or in any other suitable manner.

FIG. 8 further illustrates that the cover 112 may include one or more storage locations 806(1) and 806(2) for storing accessory devices 108 that are either currently not attached to the deployable arm 106 of FIGS. 1 and 3-7, or accessory devices that do not form a portion of the stack of the accessory assembly 804. In either instance, the storage locations 806(1) and 806(2) may store the accessory devices in any number of ways, such as within a sleeve, via hook and loop fasteners, magnetically, or in any other suitable fashion. In some instances, each corner of the cover 112 includes one of the illustrated accessory-device storage locations.

Figure 9:
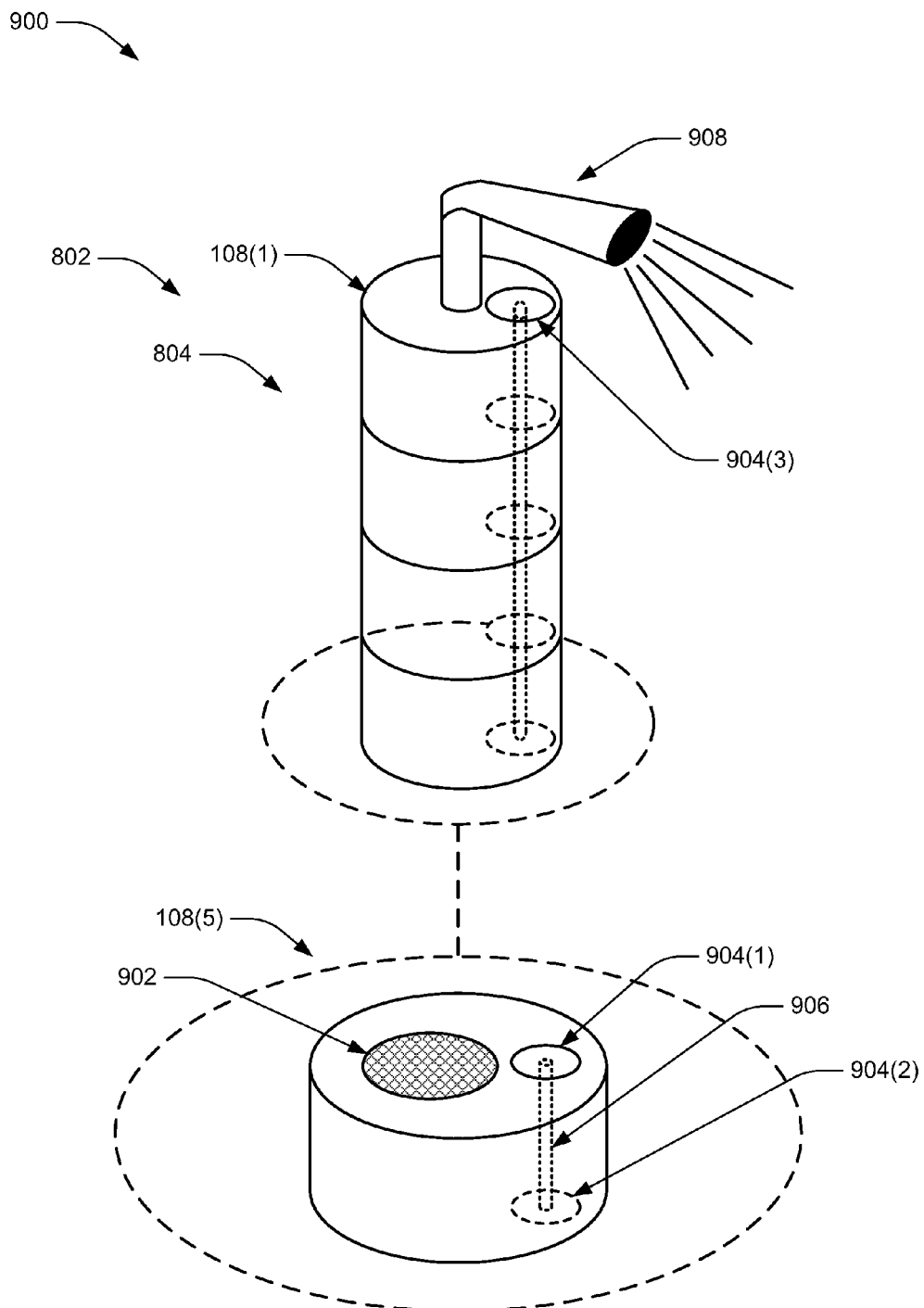
FIG. 9 shows further details of the stack of accessory devices of FIG. 8, such as sensors that enable the accessory devices to determine a configuration and order of the stack.

FIG. 9 shows a perspective view 900 of further details of the accessory assembly 802 comprising the stack of accessory devices from FIG. 8. Specifically, FIG. 9 illustrates example components within one of the accessory devices forming a portion of the deployable arm 804. In this example, the accessory device comprises the speaker/microphone 108 (5) of FIG. 1. As illustrated, this accessory device 108(5) includes accessory functionality 902, which here comprises a speaker or microphone.

In addition, the accessory device 108(5) includes a top sensor 904(1), a bottom sensor 904(2), and a circuitry wire 906. Further, each of the accessory devices that forms a portion of the deployable arm 804 may include similar or the same components at the same or similar locations. As such, each of the sensors may function to identify whether or not other it is currently in contact with another sensor. If so, then the accessory device can deduce that it is not on top or on bottom of the deployable arm.

For instance, in the illustrated example the accessory assembly 802 may couple to the eBook reader device 102 at a predefined footprint or attachment location within the cover 112 or the device 102 itself. In either instance, the predefined footprint may include a sensor or another component that is configured to mate with an accessory device, such as the accessory device 108(5).

In this example, the bottom sensor 904(2) of the accessory device 108(5) may identify the sensor or the other component of the cover 112 or the device 102 and may deduce that the accessory device 108(5) resides at the bottom of the stack forming the deployable arm. In addition, the top sensor 904 (1) may contact a bottom sensor of the accessory device on top of the subject accessory, thus causing the accessory device 108(5) to deduce that it does not reside on top of the stack.

A top sensor 904(3) on the reading light 108(1), meanwhile, may determine that it is not contacting any other sensor and, hence, that the reading light 108(1) resides on top of the stack. With this knowledge, the reading light 108(1) may function to power on when a user deploys an arm portion 908 of the reading light 108(1) (e.g., when the user pulls out the arm portion 908 from within a housing of the accessory device). Meanwhile, each accessory device within the stack, such as the accessory device 108(5), may pass power and/or data between the eBook reader device 102 and the reading light 108(1) via the device's respective circuitry wire 906. In some instances, the circuitry 906 wire comprises multiple different wires for passing different portions of data and/or power. Further, in other implementations the device may pass this data inductively or wirelessly with one another and/or with the eBook reader device 102.

With use of the accessory assembly 802, a user of the eBook reader device 102 and the accessory devices 108 may be able to arrange the accessory devices 108 in different desired configurations. For instance, the user may be able to place a reading light 108(1) on top of the stack and a speaker/microphone 108(5) underneath when the user desires to light the display 110 of the device 102. However, when the user wishes to employ a speaker or microphone for use with the device 102, the user may reverse the order of the stack. In this latter configuration, the speaker/microphone 108(5) may be operational in unison with the eBook reader device 102, while the reading light 108(2) may simply serve as a conduit for power and/or data. While FIGS. 8 and 9 describe an implementation where an accessory device 108 residing on top of the stack forming the deployable arm 804 is operational, in other implementations one or more other accessory devices may be equally operational without regard to their location within the stack.

In still other instances, one or more of the accessory devices illustrated as forming a portion of the deployable arm 804 may include functionality on a top and on a bottom of the respective device. For instance, the speaker 108(5) may include the speaker functionality on the "top" of the device, as well as a different type of accessory functionality on the "bottom" of the device (e.g., a microphone). As such, when the speaker/microphone combination resides on the bottom of the accessory assembly 802 (i.e., the deployable arm 804), then a user could flip over the accessory assembly 802 to utilize the microphone. One or more of the accessory devices may include a gyroscope, accelerometer, or other functionality to determine an orientation of the accessory assembly 802 so that the microphone or other device "on top" may recognize when it is in fact the operational accessory device.

Illustrative Process for Deploying Accessory Assemblies

Figure 10:
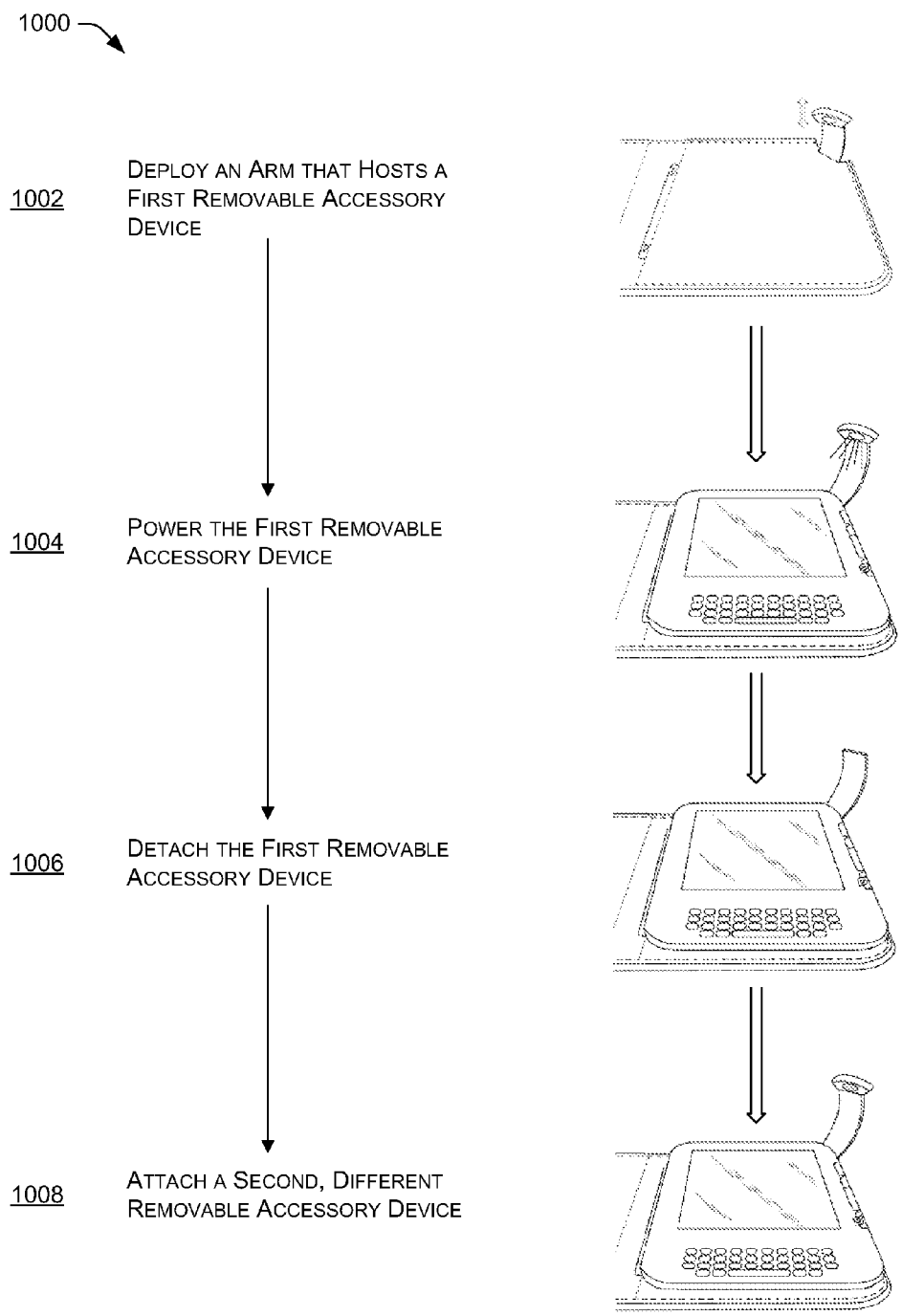
FIG. 10 illustrates an example process of deploying a deployable arm and attaching different accessory devices to the deployable arm.

FIG. 10 illustrates an example process 1000 of deploying a deployable arm attaching different accessory devices to the deployable arm using the techniques described above. While the process 1000 is described with reference to the accessory assemblies described above, this process may apply equally to other environments and assemblies.

The process 1000 includes an operation 1002, which represents deploying an arm that is configured to detachably host a first removable accessory device to an operational position. For instance, this operation may represent deploying the deployable arm 106 that includes the reading light 108(1) and/or any other accessory device 108. In some instances, the deployable arm 106 couples directly or indirectly to an electronic device during the deployment.

An operation 1004, meanwhile, represents powering the first removable accessory device while the deployable arm is in the operational position. In some instances, the deploying of the arm itself may trigger power to the accessory device, while in other instances the accessory device itself may include a power switch. Further, the device and/or the deployable arm may house the power supply for powering the first removable accessory device.

Next, an operation 1006 represents detaching the first removable accessory device. In instances where the deployable arm and the first removable accessory device include threads, this operation may include unthreading the first removable accessory device from the arm. In instances where the first removable accessory device and the arm couple magnetically or via a form fit, this operation may comprise removing the accessory device with force.

Finally, the process 1000 includes an operation 1008. This operation includes attaching a second, different removable accessory device to the deployable arm, such as the arm 106. This attaching may use any of the techniques described above. Further, this second removable accessory device may comprise any of the accessory devices 108 of FIG. 1 or otherwise, and may be detached from the deployable arm in the operational position, the storage position, or any other position there between.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a cover configured to couple with an electronic book (eBook) reader device and reside in either an open state to facilitate operation of the eBook reader device or a closed state to protect a display of the eBook reader device;
a deployable arm coupled to the cover and configured to:
slide out from within the cover and extend over the display of the eBook reader device when the cover is in the open state; and
slide into the cover and lie flat within the cover when the cover is in the closed state; and
multiple different accessory devices configured to attach removably and interchangeably to the deployable arm, each of the multiple different accessory devices providing respective functionality during the operation of the eBook reader device, wherein:
each respective one of the multiple different accessory devices is configured to communicate an associated identifier to the eBook reader device upon attachment to the deployable arm, the identifier identifying the respective accessory device to the eBook reader device; and
at least one accessory device of the multiple different accessory devices is configured to receive power from the eBook reader device.

2. A system as recited in claim 1, wherein the deployable arm comprises a shape-memory alloy connector.

3. A system as recited in claim 1, wherein:
the cover comprises a physical-electrical coupling configured to connect the cover to the eBook reader device and provide power to the cover from the eBook reader device; and
the deployable arm is configured to provide power from the cover to the at least one accessory device.

4. A system as recited in claim 1, wherein the at least one accessory device is configured to receive the power from the eBook reader device via the deployable arm.

5. A system as recited in claim 1, wherein the multiple different accessory devices comprise one or more of:
a reading light configured to illuminate the display of the eBook reader device;
a projector to project content onto the eBook reader device;
a stylus to facilitate operation of the eBook reader device;
a universal serial bus (USB) drive to receive a USB card;
a camera to receive images of an environment proximate to the eBook reader device;
a microphone to receive audio from the environment proximate to the eBook reader device;
an ambient light sensor to detect an amount of ambient light in the environment proximate to the eBook reader device;
an audio jack to receive a headphone or microphone connection;
a speaker to output audio;
a page-turn button to navigate the content output by the eBook reader device;

a biometric sensor to facilitate access to the eBook reader device via biometric credentials;

an accelerometer to detect motion of the eBook reader device;

a gyroscope to detect an orientation of the eBook reader device; or a compass to detect a direction that the eBook reader device faces.

6. A system as recited in claim 1, wherein the multiple different accessory devices are configured to couple with one another and form at least a portion of the deployable arm.

7. A system as recited in claim 1, wherein the multiple different accessory devices are configured to attach removably and interchangeably to the deployable arm via at least one of: magnetic attraction, a pin, a latch, screw threads, or a force fit.

8. A system as recited in claim 1, wherein each respective accessory device is configured to provide the associated identifier via at least one of:
- a wireless signal to the eBook reader device;
- an amount of pressure placed upon a spring within the deployable arm when the respective accessory device attaches to the deployable arm;
- a depth of a portion of the respective accessory device within the deployable arm when the respective accessory device attaches to the deployable arm; or
- a pin connection made between the respective accessory device and the deployable arm when the respective accessory device attaches to the deployable arm.

9. A system as recited in claim 1, wherein the deployable arm is further configured to provide a data pathway to communicate data between the eBook reader device and one or more of the multiple different accessory devices when attached to the deployable arm.

10. A system as recited in claim 1, wherein the cover further comprises storage for one or more of the multiple different accessory devices when not attached to the deployable arm.

11. An assembly comprising:
an electronic device;
a first accessory device to facilitate or enhance operation of the electronic device in a first manner;
a second accessory device to facilitate or enhance operation of the electronic device in a second, different manner; and
a deployable arm configured to:
host, detachably and individually, the first accessory device and the second accessory device;
slide into a storage position when neither the first nor the second accessory devices are in use and to slide out from the storage position into an operational position positioned over or adjacent to the electronic device when the first or the second accessory device is in use and attached to the deployable arm; and
provide a data pathway to communicate data between the electronic device and at least one of the first accessory device or the second accessory device,
wherein the first and the second accessory devices are each configured to communicate an associated identifier to the electronic device upon attachment to the deployable arm, the identifier identifying the respective accessory device to the electronic device.

12. An assembly as recited in claim 11, wherein the first accessory device consumes power when facilitating or enhancing operation of the electronic device in the first manner, and wherein the deployable arm provides the power to the first accessory device.

13. An assembly as recited in claim 12, wherein the deployable arm further comprises one or more batteries stored within the deployable arm, and wherein the deployable arm provides the power to the first accessory device via the one or more batteries.

14. An assembly as recited in claim 12, wherein the deployable arm couples to the electronic device to receive power from a power supply of the electronic device, and wherein the deployable arm provides the power from the power supply of the electronic device to the first accessory device.

15. An assembly as recited in claim 11, wherein the first accessory device comprises a reading light configured to illuminate a display of the electronic device.

16. An assembly as recited in claim 11, wherein the first and the second accessory devices are configured to attach removably and interchangeably to the deployable arm magnetically or via a pin, a latch, screw threads, or force fit.

17. An accessory assembly comprising:
a cover to couple with an electronic device, wherein the cover does not include a power source;
a reading light to illuminate a display of the electronic device when the electronic device is coupled to the cover; and
a deployable arm coupled to the cover of the electronic device and to host detachably the reading light and at least one other accessory device, the deployable arm further configured to slide out from a storage position within the cover of the electronic device to an operational position, the operational position positioning the reading light over the display of the electronic device to facilitate illumination of the display when the reading light attaches to the deployable arm, wherein the deployable arm provides power to the reading light during operation, the power being received from the electronic device via a conductive path of the cover, when the electronic device is coupled to the cover,
wherein the at least one other accessory device is configured to communicate an associated identifier to the electronic device upon attachment to the deployable arm, the identifier identifying the at least one other accessory device to the electronic device.

18. An accessory assembly as recited in claim 17, wherein the deployable arm is configured to host detachably the reading light or the at least one other accessory individually and one at a time.

19. An accessory assembly as recited in claim 17, wherein the cover further includes a conductive path configured to transfer power between the electronic device and the deployable arm when the electronic device is coupled to the cover.

20. An accessory assembly comprising:
a cover to couple with an electronic device, wherein:
a power source is located within the electronic device; and
the cover does not include a separate power source;
a deployable arm coupled to the cover;
a first accessory device configured to facilitate or enhance operation of the electronic device in a first manner, wherein the first accessory device receives power from the power source that is located within the electronic device, via the deployable arm and a conductive path of the cover, when the electronic device is coupled to the cover; and
a second accessory device to facilitate or enhance operation of the electronic device in a second, different manner;
wherein the first and second accessory devices are configured to stack atop one another with the first accessory device residing on top in a first configuration and on bottom in a second configuration, wherein the first accessory device is operational in the first configuration but not in the second configuration and the second accessory device is operational in the second configuration but not in the first configuration; and wherein the first and the second accessory devices are each configured to communicate an associated identifier to the electronic device upon attachment to the deployable arm, the identifier identifying the respective accessory device to the electronic device.

21. An accessory assembly as recited in claim 20, wherein the first and second accessory devices each include one or more sensors to determine whether the accessory devices reside within the first configuration or the second configuration.

22. An accessory assembly as recited in claim 20, further comprising multiple additional accessory devices configured to stack atop the first and second accessory devices in multiple other configurations, each of the multiple additional accessory devices facilitating or enhancing operation of the electronic device in a respective manner.

\* \* \* \* \*